United States Patent [19]

Ichikawa et al.

[11] Patent Number: 5,609,560
[45] Date of Patent: Mar. 11, 1997

[54] MEDICAL OPERATION DEVICE CONTROL SYSTEM FOR CONTROLLING A OPERATION DEVICES ACCESSED RESPECTIVELY BY ID CODES

[75] Inventors: Yoshito Ichikawa, Ogose-machi; Satoshi Takemoto, Oume; Kouji Tanikawa, Hachioji, all of Japan

[73] Assignee: Olympus Optical Co., Ltd., Tokoyo, Japan

[21] Appl. No.: 419,527

[22] Filed: Apr. 10, 1995

Related U.S. Application Data

[63] Continuation of Ser. No. 107,172, Aug. 17, 1993, abandoned.

[30] Foreign Application Priority Data

Aug. 19, 1992 [JP] Japan ................... 4-220479

[51] Int. Cl.$^6$ ................ A61B 1/00; G06F 15/82; G05B 23/00
[52] U.S. Cl. ................. 600/101; 600/118; 606/1; 340/825.07
[58] Field of Search .................. 600/101, 117, 600/118, 921; 340/825.04, 825.06, 825.31, 825.34, 825.08, 825.54, 825.07, 286.01; 395/200; 364/140, 132, 131, 413.02

[56] References Cited

U.S. PATENT DOCUMENTS

| | | |
|---|---|---|
| 4,818,993 | 4/1989 | Stöckel ............... 340/825.06 |
| 4,835,699 | 5/1989 | Mallard ............... 340/825.06 X |
| 4,928,097 | 5/1990 | Staab et al. . |
| 4,959,721 | 9/1990 | Micic et al. . |
| 5,095,417 | 3/1992 | Hagiwara et al. .......... 340/825.06 X |
| 5,128,666 | 7/1992 | Munier et al. ............. 340/825.06 X |
| 5,217,003 | 6/1993 | Wilk ....................... 128/4 |
| 5,223,825 | 6/1993 | Ikezaki ................... 340/825.07 X |
| 5,223,826 | 6/1993 | Amou ..................... 340/825.06 |
| 5,235,510 | 8/1993 | Yamada et al. ............ 364/413.02 |
| 5,241,482 | 8/1993 | Iida et al. ............... 340/825.06 X |

*Primary Examiner*—Richard J. Apley
*Assistant Examiner*—John P. Leubecker
*Attorney, Agent, or Firm*—Armstrong, Westerman, Hattori, McLeland & Naughton

[57] ABSTRACT

A communication port of a concentrated controller for performing concentrated control, and a communication port of each of a plurality of operation devices having respective peculiar ID codes are connected to each other by a signal transmitting cable or the like. An ID code of an operation device intended to be accessed from the concentrated controller is transmitted, whereby each of the operation devices judges whether or not the transmitted ID code is in agreement with one's own ID code. Access is made only to the operation device when the ID code is in agreement with one's own ID code. The operation of such device is capable of being controlled by transmitted information; and such operation is preferably related to a medical environment.

24 Claims, 11 Drawing Sheets

MEDICAL OPERATION DEVICE CONTROL SYSTEM FOR CONTROLLING A OPERATION DEVICES ACCESSED RESPECTIVELY BY ID CODES

This application is a continuation of application Ser. No. 08/107,172 filed Aug. 17, 1993, now abandoned.

BACKGROUND OF THE INVENTION

1. Field of the Invention:

The present invention generally relates to an operation-device control system for controlling, in a concentrated manner, a plurality of operation devices accessed respectively by ID codes.

2. Discussion of Related Art:

Generally, upon the performance of an operation, a plurality of operation devices are selectively used in accordance with an objective or a purpose. However, an operator performs the operation in a clean area or region within an operating chamber. That is, since an operating section of each of the operation devices is within a dirty environment, the operator can operate each of the operation devices, without being in direct contact with the operation devices.

Further, functions of the respective operation devices are individually performed independent from each other, and there are many cases where the functions of the respective operation devices are inadequate for composite using modes.

Accordingly, because the prior art performs as required or in accordance with the instructions from an operator, while the operator moves between the operation devices, the operating environment for the operator is not a well suited operating environment. Thus, the operation, which requires real time, requires a highly skilled operator.

Moreover, there exist operation devices which are provided with communication ports. However, the communication ports outputs information for display is a printer, a monitor or the like. Systematic communication is not performed due to communication or the like between the operation devices or between the operation devices and control means (such as, a computer).

Accordingly, in the prior art, because the systematic communication due to communication or the like between the operation devices or the operation devices and the control means (such as, the computer) is not performed, it has been necessary for the operator to be allocated to each of the devices for a small number of operators to operate a plurality of devices by instructions from an operator in a case where such devices are used within an operating room.

As a result, the interior of the operating chamber becomes narrow or confined, and various devices must be set and prepared in accordance with the kind or type of operation. In addition to the operation being complicated, there is also a case which requires particularly prompt operation so that exertion is required for the operation to proceed.

OBJECTS AND SUMMARY OF THE INVENTION

It is an object of the invention to provide an operation-device control system which is capable of controlling a plurality of operation devices at a single location in a concentrated manner.

It is another object of the invention to provide an operation-device control system which facilitates systematization, enables composite interlocking operation, and is easy to operate.

An operation-device control system according to the invention is provided with a plurality of operation devices each having a communication port capable of performing bi-directional communication with a device body having recognition numbers and having concentrated control means respectively connected to the communication ports of the respective operation devices so as to be capable of controlling the operation devices in a concentrated manner.

A common communication port and peculiar recognition numbers are respectively allocated to the operation devices, whereby it is possible to recognize the operation devices without error. The communication port is connected to the concentrated control means, whereby it is possible to perform interlocking operation and concentrated control of the associated operation devices.

As a result, it is possible in the present invention for a single operator to control all the operation devices in an interlocking manner. Further, it is possible to freely combine the required operation devices by the united or unified communicating function and the recognizing numbers peculiarly allocated to the operation devices.

BRIEF DESCRIPTION OF THE DRAWINGS

FIG. 2 is a block diagram showing a functional arrangement of the first embodiment;

FIG. 3 is a block diagram showing a specific or concrete arrangement of a concentrated controller;

FIG. 4 is a block diagram showing a specific or concrete arrangement of operation devices;

FIG. 5 is an explanatory view showing an example of connecting lines between the concentrated controller and the operation devices;

FIG. 6 is a flow chart showing processing contents in a case where the operation devices are selectively controlled by the concentrated controller;

FIG. 7 is a flow chart showing processing contents in Step S1 in FIG. 6;

FIG. 8 is a flow chart showing processing contents in step S2 in FIG. 6;

FIG. 9 is a flow chart showing processing contents in step S3 in FIG. 6;

FIG. 10 is an explanatory view showing processing contents on the side of the concentrated controller and on the side of the operation device;

FIG. 11 is an explanatory view showing a specific or concrete example of the first embodiment;

FIG. 12 is an explanatory view showing an example of a format in a case where information in a modification of the first embodiment is transmitted in a packet;

FIG. 14 is a block diagram showing a specific or concrete example of a wireless adaptor.

DETAILED DESCRIPTION OF THE PREFERRED EMBODIMENTS

Various embodiments of the invention will hereinafter be described with reference to the accompanying drawings.

Figure 1:
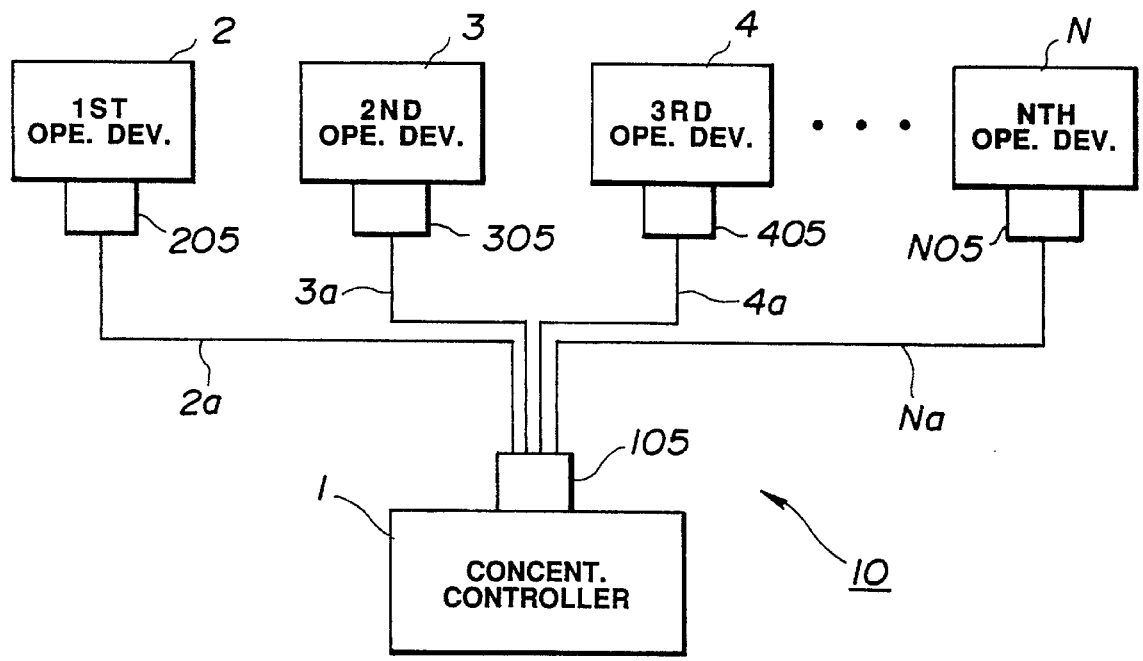
FIGS. 1 to 12 relate to a first embodiment of the invention, FIG. 1 being a block diagram showing a conceptional arrangement of an operation-device control system according to the first embodiment.

As shown in FIG. 1, an operation-device control system 10 according to a first embodiment of the invention comprises a concentrated controller 1, and first, second, third . . . Nth operation devices 2, 3, 4 . . . , N with respective functions being different from each other and which are connected to the concentrated controller 1 through cables 2a, 3a, 4a, . . . , Na which transmit signals. The cables 2a, 3a, 4a, . . . , Na are connected to a communication port 105 of a concentrated controller 1 and communication ports 105 of the respective first, second, third . . . and Nth operation devices 2, 3, 4, . . . , N.

An operator operates the concentrated controller so as to be capable of remotely controlling the first, second, third . . . , Nth operation devices 2, 3, 4, . . . , N in a concentrated manner.

These operation devices 2~N include, for example, a high-frequency electrocautery apparatus, a high-speed peritoneal apparatus, an endoscope apparatus, an ultrasonic surgical-knife apparatus or the like.

Figure 2:
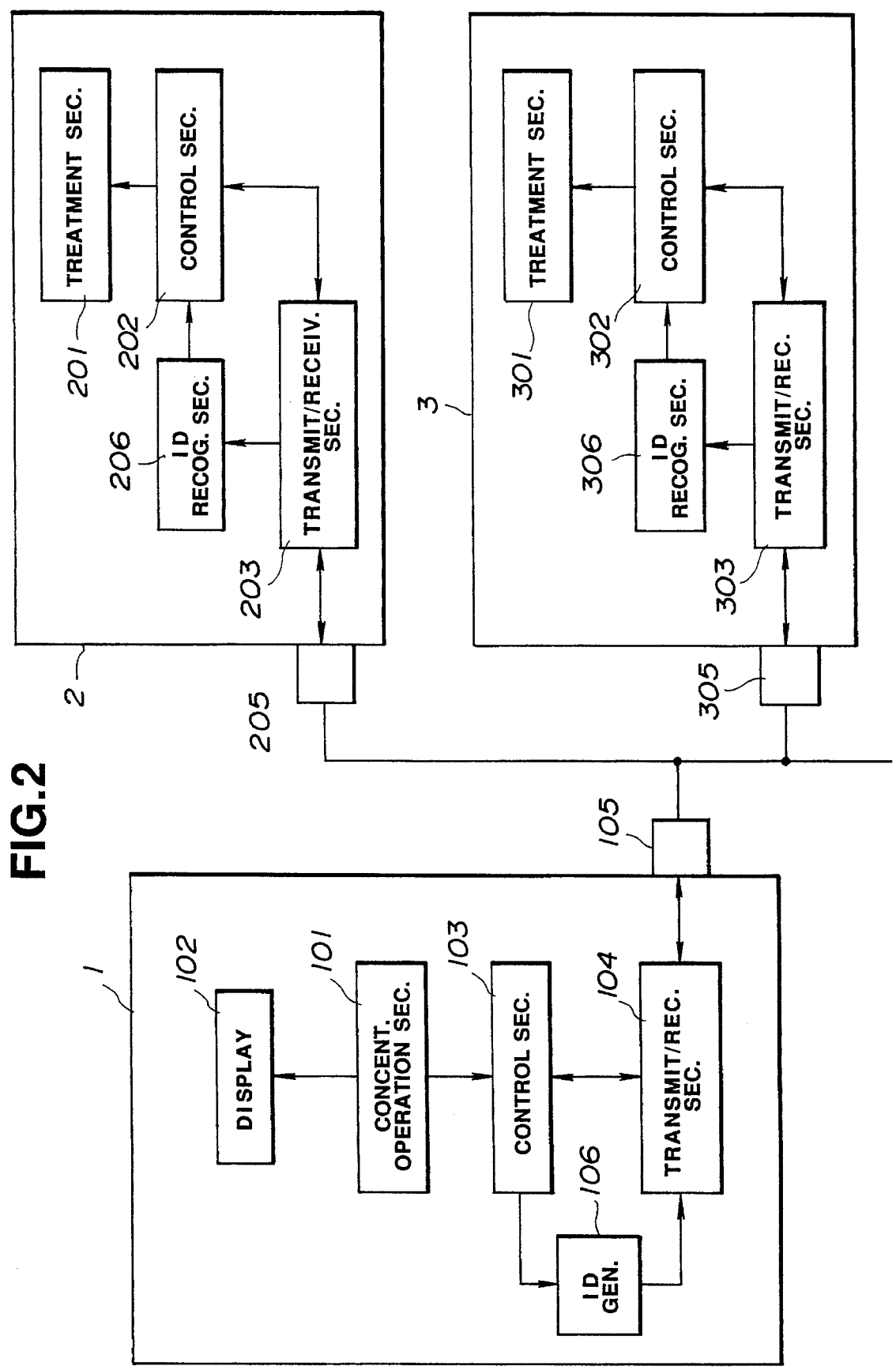

Further, as shown in FIG. 2, the concentrated controller 1 includes a concentrated operation section 101 for performing operation to control operation of an optional operation device i (i=2, 3, 4, . . . , N); a display 102 connected to the concentrated operation section 101 for displaying operation contents or the like; a control section 103 for generating operation information corresponding to the operation contents operated by the concentrated operation section 101 and for performing control of communication; and a transmitting/receiving section 104 connected to the communication control section 103 for transmitting a command and a signal (such as, data or the like) and for receiving a signal (such as, a receiving acknowledgment signal or the like). The transmitting/receiving section 104 is connected to the communication port 105 of RS-232C, for example.

Before the operation information generated by the concentrated operation section 101 is transmitted through the transmitting/receiving section 104, the operator performs such operation so as to select an objective operation device j to be controlled in an operation by the operation information. With such selective operation, before the operation information is transmitted, an ID code of the objective operation device j is transmitted. The operator accesses the objective operation device j in order to selectively control operation of only the objective operation device j. For this reason, the concentrated controller 1 has an ID-code generating section 106 which can generate all the ID codes of the operation devices 2~N so as to be capable of accessing an optional operation device i. Moreover, the ID-code generating section 106 can also generate ID codes of the concentrated controller 1. In a case where the operator informs the objective operation device j of the fact that a transmitting origin is the concentrated controller 1, the ID codes of the concentrated controller 1 are transmitted.

The operation devices i which are respectively connected to the common communication port 105 through cables i0ia have a treatment section i01 therein for performing treatment for operation, a control section i02 connected to the treatment section i01 for electrically performing control of the operation of the treatment section i01 and for performing control of communication, a transmitting/receiving section i03 connected to the control section i02 for performing receiving of a command or the like and transmission of a receiving acknowledgement signal or the like, and a communication port i05 of RS-232C, for example, connected to the transmitting/receiving section i03.

Furthermore, the operation device i has an ID recognition section i06 for recognizing whether or not a specific ID code is in agreement with one's own ID code registered individually. In accordance with the recognition results of the ID recognition section i06, the control section i02 is brought to a condition in which operation or the like of the treatment section i01 can be controlled by transmitted information.

Figure 3:
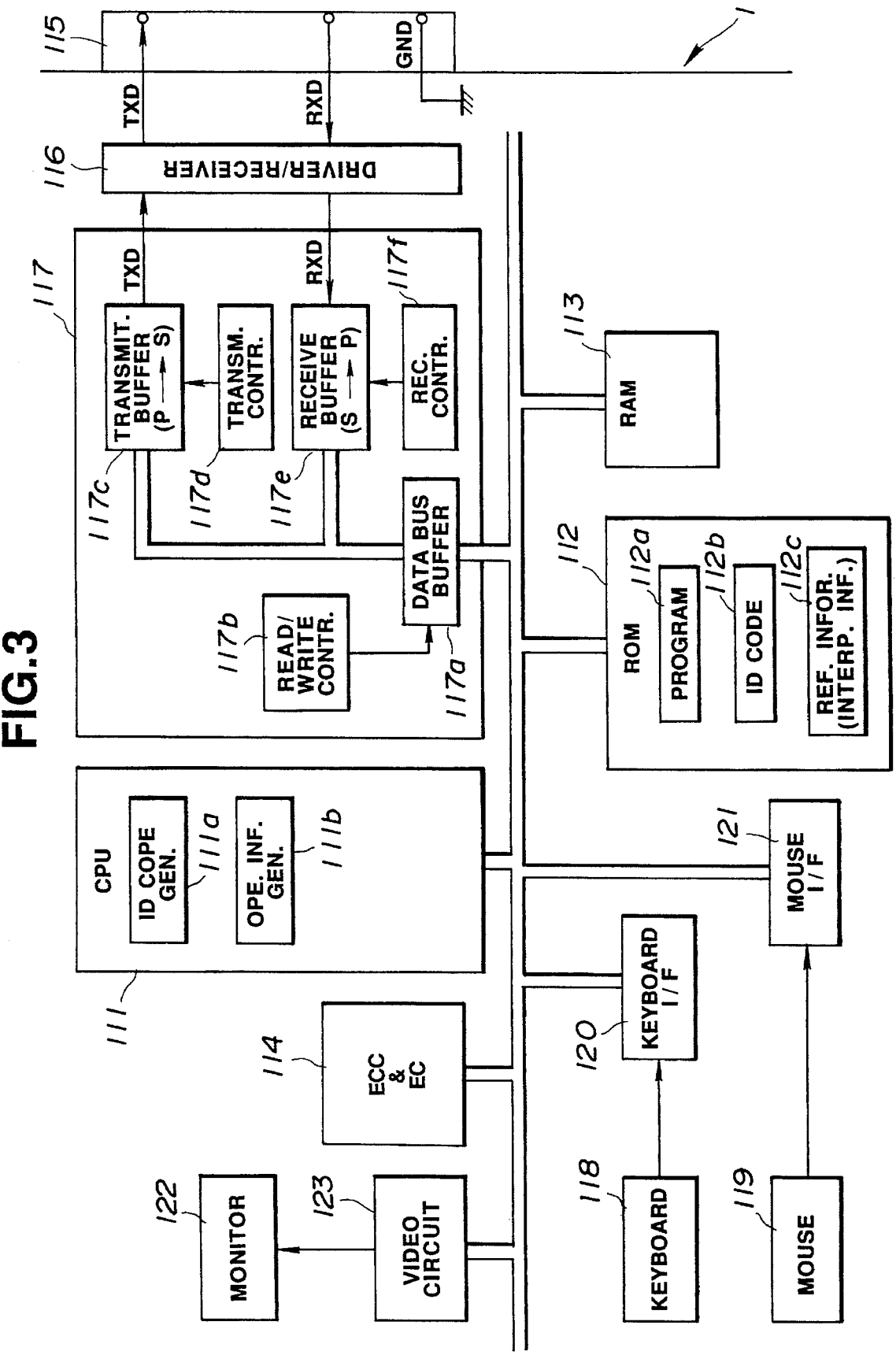

FIG. 3 shows a specific arrangement of the concentrated controller 1. That is, the concentrated controller 1 comprises a CPU 111 for performing control of the entirety, a ROM 112 connected to the CPU 111 by a bus, into which a control program of the CPU 111 or the like are written, a RAM 113 in which data or the like are stored, an ECC and EC circuit 114 for providing error correction numerals or characters and error correction, an RS-232C I/F 117 connected to an RS-232 connector 115 through a receiver and driver 116, for performing transmission of a command or the like, receiving of the receiving acknowledgement signal or the like, a keyboard I/F 120 and a mouse I/F 121 respectively connected to a keyboard 118 and a mouse 119, and a video circuit 123 connected to a monitor 122 for generating an image signal.

The ROM 112 is provided with a program storing area 122a, an ID-code storing area 112b and a reference-information storing area 112c. A control program of the CPU 111 is stored in the program storing area 112a.

The ID code inputted to the concentrated controller 1 and the individual ID codes given respectively inputted to the operation devices 2~N are stored in the ID-code storing area 112b. Specific names of the concentrated controller 1 and the operation devices 2~N are stored in the ID-code storing area 112b which corresponds to the device number which in turn correspond to the concentrated controller 1 and the operation devices 2~N.

Furthermore, written to the reference-information storing area 112c is reference information (interpreting information) in which the CPU 111 interprets operating signals due to operation of the keyboard 118 and operation of the mouse 119 so as to be converted to corresponding commands or the like.

It is required or necessary for the operator specify the objective operation device j in order that the operator can access the operation device j desired to be controlled.

In this embodiment, when the operator inputs the name of the operation device j or the device number from the keyboard 118, the CPU 111 uses the name of the operation device i or the device number to read out the ID code of the ID-code storing area 112b to thereby transmit the ID codes to the operation devices 2~N through the RS-232C I/F 117. That is, when the operator performs such operation so as to specify or select the objective operation device j by the keyboard 118 or by the mouse 119, the CPU 111 has an ID-code generating function 111a which specifies the objective operation device j. Further, the operator can input an operation signal (such as, a command or the like) for controlling operation of the optional operation device i from the keyboard 118 or the mouse 119. The inputted operation signal is transmitted to the CPU 111. The CPU 111 refers to the reference information so as to be converted to an operation information (such as, a command or the like) corresponding to the operation signal so as to be transmitted to the operation devices 2~N through the RS-232C I/F 117.

That is, the CPU 111 operates by way of a function 111b by the generating operation information for controlling the operation of the operation device i which corresponds to the operation of the operation means (such as, the keyboard 118 or the like). Before the operation information is transmitted to the operation devices 2~N, the ID code which specifies the objective operation device j, is transmitted to the operation devices 2~N. In the first embodiment, the ID code which specifies the objective operation device j is also temporarily stored in the RAM 113. In a case where the ID code is subsequently required again, the CPU 111 reads out the ID code from the RAM 113.

The RS-232C I/F 117 which governs transmission and receiving of the signal can be arranged by, for example, 8251, which is an LSI of USART.

The RS-232C I/F 117 includes a data bus buffer 117a connected to the CPU 111 through the bus for temporarily storing data; a read/write controller 117b for controlling reading/writing of the buffer 117a; a transmit buffer 117c for converting, in parallel/serial, data of the data bus buffer 117a in order to output the same to the driver and receiver 116; a transmit controller 117d for controlling the buffer 117c; a receiver buffer 117e for converting, in parallel/serial, serial data inputted from the driver and receiver 116 in order to transmit the same to the data bus buffer 117a; and a receiver controller 117f for controlling the buffer 117e.

Figure 4:
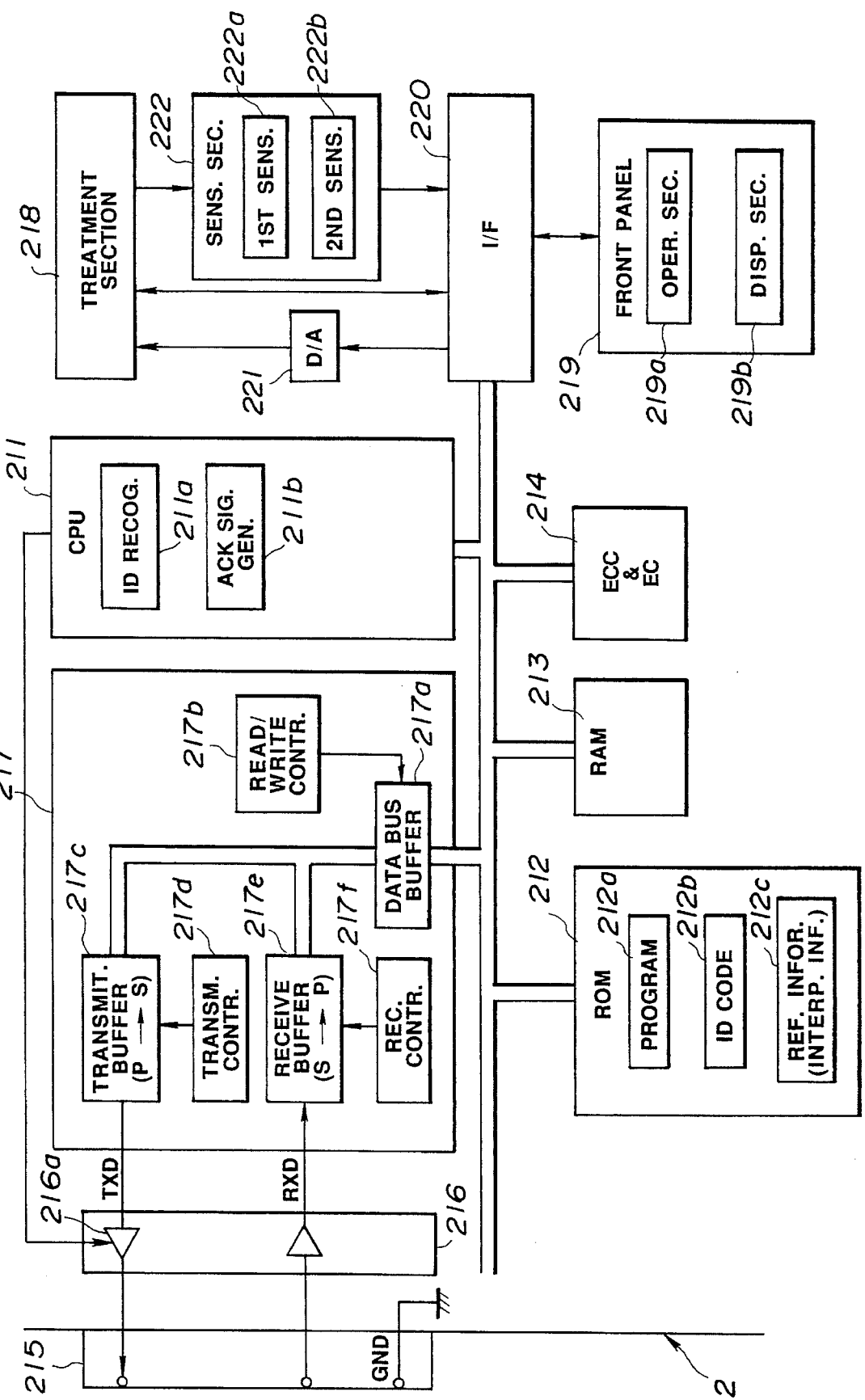

FIG. 4 shows an exemplary arrangement of the first operation device 2 which includes a CPU 211 for performing control of the operation device 2; a ROM 212 which is connected to the CPU 211 by a bus and to which a program or the like is written; a RAM 213 in which data or the like is stored; an ECC and EC circuit 214 for performing giving of an error correction character and error correction; an RS-232C I/F 217 connected to an RS-232 connector 215 through a receiver and driver 216 in order to perform transmission of the receiving acknowledgement signal; receiving of the command or the like upon transmission of the receiving acknowledgment signal; and an I/F 220 connected to a treatment section 218 for operation of a front panel 219.

The front panel 219 is provided with an operation section 219a (such as, a switch or the like) for manually operating the treatment section 218; a display section 219b capable of a recognition operating condition (setting condition) of the treatment section 218 or the like. The display section 219b is made of an LCD, an LED or the like.

In a case where the I/F 220 controls operation of the treatment section 218, the I/F 220 outputs an analog control signal through a D/A converter 221 in a case where an analog control signal is necessary or required.

Moreover, the treatment section 218 is connected to a sensor section 222 for detecting an operating condition of the treatment section 218. A detecting signal detected at the sensor section 222 is outputted to the I/F 220 through an A/D converter 223 or the like. The sensor section 222 has a plurality of sensors 222a, 222b or the like in accordance with a function of the treatment section 218. The I/F 220 displays the inputted detecting signal on the display section 219b of the operation panel 219, and transmits the inputted detecting signal to the CPU 211. The CPU 211 adds the detecting signal, information specifying the sensor which outputs the detecting signal or the like to each other in order to transmit the same to the ECC and EC circuit 214. Further, the CPU 211 adds an error character so as to be capable of transmitting the same toward the concentrated controller 1 (i.e., the operating condition of the treatment section 218 can be confirmed or recognized) on the side of the concentrated controller 1.

The RS-232C I/F 217, which governs transmission and receiving of the signal, can be formed by 8251, for example, which is an LSI of a USART.

The RS-232C I/F 217 includes a data bus buffer 217a which is connected to the CPU 211 through a bus and for temporarily storing therein data; a read/write controller 217b for controlling reading/writing of the buffer 217a; a transmit buffer 217c for converting, in parallel/serial, the data of the data bus buffer 217a to output the same to the driver and receiver 216; a transmit controller 217d for controlling the buffer 217c; a receiver buffer 217e for converting, in serial/parallel, serial data inputted from the driver and a receiver 216 to transmit the same to the data bus buffer 217a; and a receiver controller 217f for controlling the buffer 217e.

The ROM 212 is provided with a program storing area 212a; an ID-code storing area 212b; and a reference-information storing area 212c. A control program of the CPU 211 is stored in the program storing area 212a.

The ID code (01) inputted to the concentrated controller 1 and the individual ID codes (02) inputted to the operation device 2 are stored in the ID-code storing area 212b. Specific names of the concentrated controller 1 and the operation device 2 are stored in the ID-card storing area 212b which correspond to the device number thereto.

Furthermore, reference information (interpretation information) is written to the reference-information storing area 212c. Such reference information (interpretation information) is converted to codes or the like for interpreting a signal (such as, a command or the like) transmitted from the concentrated controller 1 in order to control operation of the operation treatment section 218.

In a case where an ID code (0j) for specifying an operation device j is transmitted from the concentrated controller 1, the CPU 211 performs judgement as to whether or not the specific code (0j) is in agreement with ID code (02) which is stored in the ID-code storing area 212b.

That is, the CPU 211 functions as an ID recognizing section 211a which recognizes whether or not the received ID code (0j) is coincident or in agreement with the ID code (02) of the operation device 2. In a case where the ID code (0j) is coincident with the ID code (02), the operation device j having the ID code (0j) is accessed.

Further, in a case where it is judged (recognized) that the ID code (0j) is in agreement with the ID code (02), the CPU 211 replies or answers a signal which recognizes that the ID code (0j) is an agreement with the ID code (02). As the recognizing signal, in the present embodiment, the ID code (02) of the operation device 2 is replied to or answered. That is, the CPU 211 has acknowledge-signal generating function 211b.

Moreover, when the ID code (01) of the concentrated controller 1 is transmitted from the concentrated controller 1, as a signal which expresses that the concentrated controller 1 is a transmitting origin, the CPU 211 recognizes the ID code (01), and transmits the ID code (01).

By the transmission and recognition of the ID code between the transmitting origin and the receiving or receipt side, the concentrated controller 1 and the specific operation device j are brought to a connecting condition (or an access condition) in which transmittance and receipt of the signal are performed. Subsequently, a command or the like which controls the operation of the operation device j are transmitted from the concentrated controller 1. The operation device j refers a signal (such as, the received command or the like) to the reference information in order to recognize the contents thereof so as to control the operation of the treatment section 218 through the I/F 220.

A buffer 216*a* of three (3) states, which is connected to a transmitting line in the driver and receiver 216, is controlled by the CPU 211. Normally, the buffer 216*a* is set to a high-impedance condition. Thus, the transmitting line is brought to a release condition. In a case where one's own ID code is transmitted, the buffer 216*a* is set to "active" in a case where the recognizing signal is replied to. Further, in a case also where a signal or the like is transmitted from the operation device 2, the buffer 216*a* is also set to "active".

Figure 5:
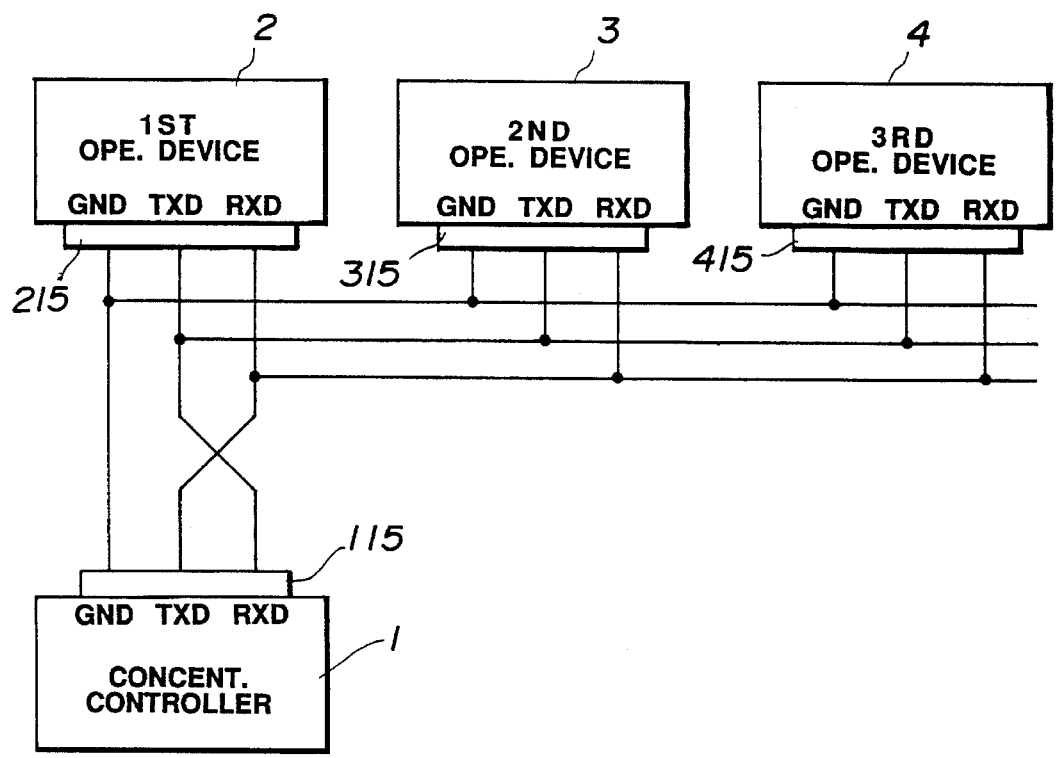

In the first embodiment, the cables 2*a*, 3*a*, ..., N*a* of RS 232C, which connect the concentrated controller 1 and the operation devices 2~N to each other, are formed by three lines (a single line is a GND line), as shown in FIG. 5. A connector 115 of the concentrated controller 1 has a transmitting terminal TXD which is connected to a receiving terminal RXD of each of the connectors i15 of the operation devices 2~N. The connector 115 of the concentrated controller 1 has a receiving terminal RXD which is connected to a transmitting terminal TXD of the connector i15 of each of the operation devices 2~N. The GND is commonly connected.

The arrangement of each of the other operation devices 3~N (i, for example) has an operation treatment section i18 which is different in specific arrangement from the operation treatment section 218; and operating panels i19 and I/F i20 corresponding to the operation treatment section i18 are used.

Figure 6:
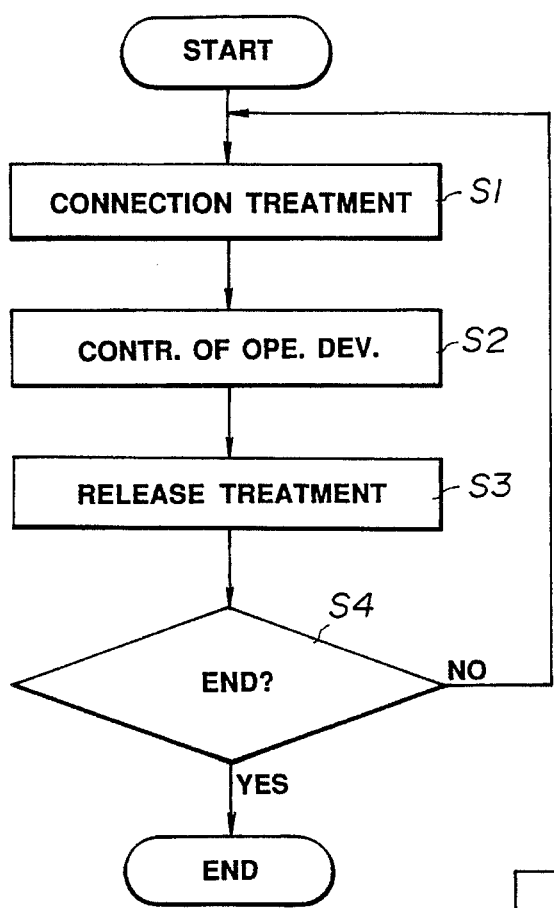

FIG. 6 is a schematic view showing treatment operation of communication control by a handshake according to the first embodiment of the invention.

An operator receives instructions from a doctor, and performs connecting processing (or access processing) between the concentrated controller 1 and the operation device 2 as shown in Step S1 in FIG. 6, which is capable of performing communication in both directions, in order to operate the, for example, operation device 2.

By the connecting processing, the concentrated controller 1 and the operation device 2 are brought to a connecting condition, and are brought to a condition capable of performing communication in both directions. Subsequently, the operator performs operation by transmitting a command or the like to thereby be capable of controlling the operation of the operation device 2 (refer to Step S2).

After the operation of the operation device 2 has been controlled, when a command which completes or terminates the operation of the operation device 2 is transmitted, release treatment is performed in which the concentrated controller 1 and the operation device are released, as shown in Step S3.

After the release treatment, selection is performed as to whether or not termination or end is selected (refer to Step S4). Unless the end is selected, a program is returned to Step S1. Accordingly, it is possible to operate another operation device (for example, the operation device 3).

Figure 7:
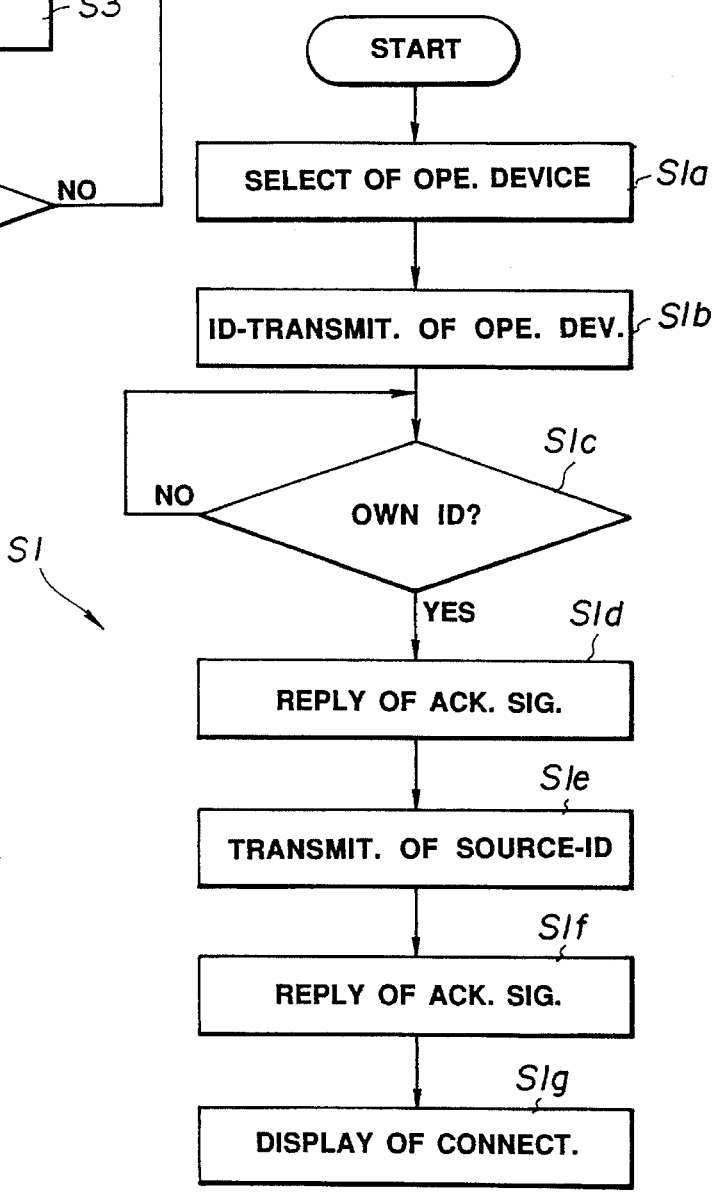

FIG. 7 shows specific or concrete contents of the connecting processing.

In order to operate, for example, the operation device 2, the keyboard 118 or the like of the concentrated controller 1 is operated in order to input a device number or the like of the operation device 2; and the operation device 3 is selected as shown in Step S1*a*.

By such a selection, the CPU 111 generates the ID code (02) of the operation device 3. The ID code (02) is transmitted to the operation devices 2~N via the I/F 117, the driver/receiver 116 and the connector 115, as shown in Step S1*b* in FIG. 7.

The operation devices 2~N judge whether or not the ID code (02) is in agreement with one's own ID code, as shown in Step S1*c* in FIG. 7. In this case, an operation device i (other than the operation device 2) judges that the ID code (02) is not in agreement with one's own ID code (0*i*). The release condition (i.e., the buffer i16*a* of the driver/receiver i16 being in high impedance) of the transmitting line is maintained, and waits for one's own ID code to be transmitted.

Meanwhile, the operation device 2 (the CPU 211 thereof) judges as being in agreement with one's own ID code (02), and replies with a recognizing signal as shown in Step S1*d*. As the recognizing signal, the ID code (02) is replied to via the I/F 217, the driver/receiver 216 and the connector 215. Subsequently, an ID code indicating a transmitting origin being transmitted waits.

The concentrated controller 1 (the CPU 111 thereof) receives the recognizing signal to thereby recognize that the operation device 2 is selected. Accordingly, the concentrated controller 1 next transmits the ID code (01) which expresses the transmission origin (Step S1*e*). When the operation device 2 receives the ID code (01), the operation device 2 recognizes that the transmission origin is the concentrated controller 1, and replies with the ID code (01) as a recognizing signal (Step S1*f*).

In this manner, the concentrated controller 1 can access the operation device 2 having the ID code (02) by a transmission of the ID code (02).

The CPU 211 of the accessed operation device 2 waits for the transmission of the command which next operates the treatment section 218 of the operation device 2.

In this case, the operation device i (other than the operation device 2) waits for one's own ID code (0*i*) is transmitted. Since the received ID code (01) is not in agreement with one's own ID code (0*i*), the operation device i continues a condition of waiting for one's own ID code (0*i*) to be transmitted.

The CPU 111 of the concentrated controller 1 receives the recognizing signal, whereby the CPU 111 judges that the operation device 2 recognizes the transmitting origin. The CPU 111 displays that the concentrated controller 1 is set under a connecting condition with respect to the operation device 2 on a display surface of the, for example, monitor 122 (Step S1*g*). The program proceeds to the next Step (Steps 2) of the control processing of the operation device 2.

Figure 8:
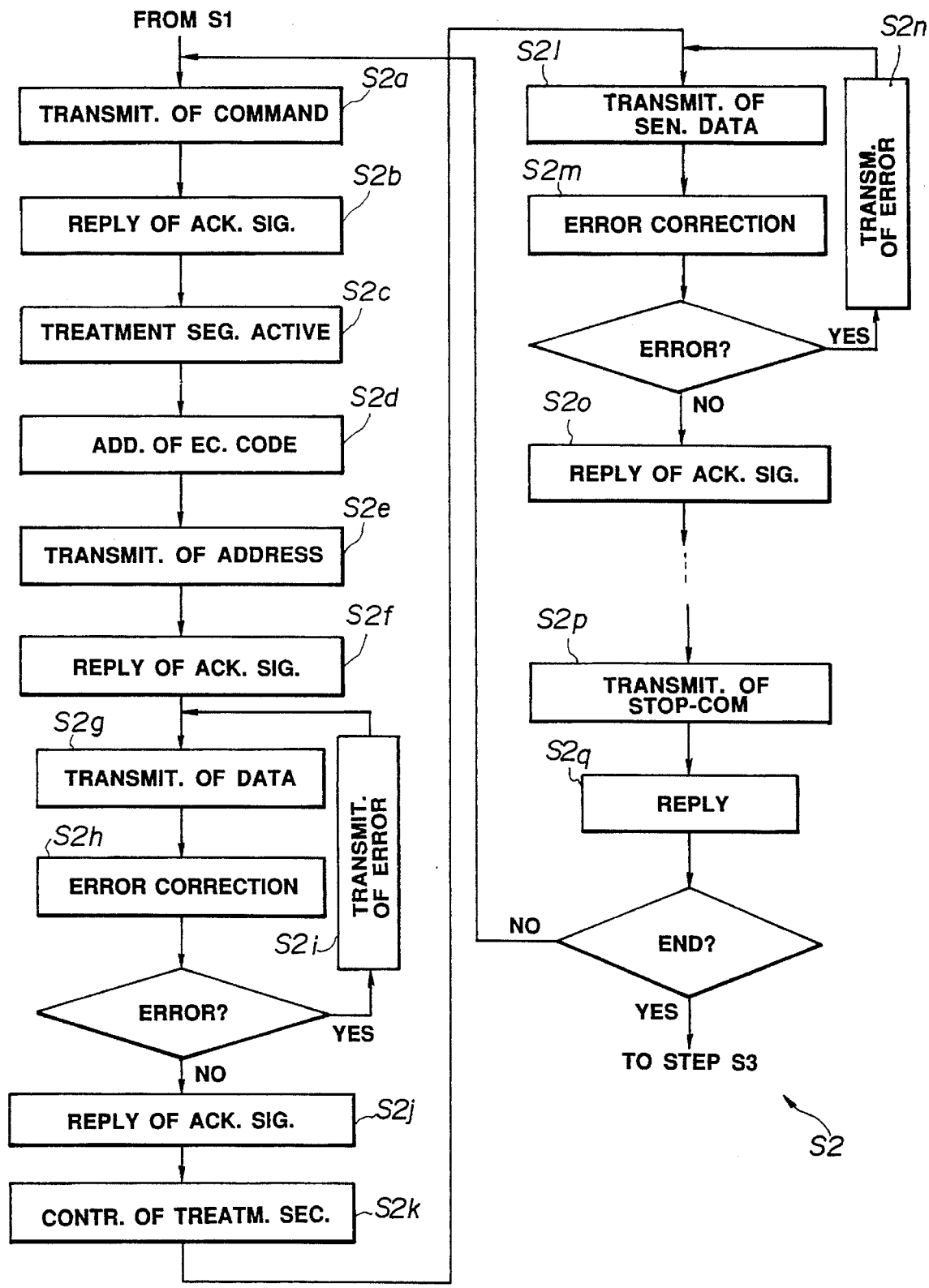

FIG. 8 shows processing contents in which operation of the operation device is controlled.

The operator operates the keyboard 118 or the like, and performs key inputting operation which corresponds to a command which turns ON or the like a switch for operating the processing section of the operation device 2.

Then, the CPU 111 converts the key inputting operation to a command corresponding thereto, and transmits the command, as shown in Step S7 (Step S2*a*).

When the CPU 211 of the operation device 2 receives the transmitted command, the CPU 211 replies with the ID code (01) as a recognizing signal (Step S2*b*). Furthermore, when the CPU 211 receives the transmitted command, the CPU 211 refers to the reference information in order to judge the instruction contents of the command, and converts the instruction contents to a code for operating the processing section 218 of the operation device 2; thereby, bringing the processing section 218 to an operating condition through the I/F 220 (Step 2*c*). Further, the code turns ON an LED or the like for recognizing an operation of the display section 219*b* of the operating panel 219 through the I/F 220 so as to enable the viewing of the processing section 218 to be brought to the operating condition.

Meanwhile, when the CPU 111 receives the replied recognizing signal, the CPU 111 displays, on the monitor 122, the fact that the processing section 218 of the operation device 2 is brought to the operating condition. Subsequently, the CPU 111 performs display which urges an operation so as to decide an operating condition for setting operating speed, and operating direction or the like of the processing section 218.

When the operation deciding the operating condition is performed, the CPU 111 transmits data generated by the operation to the ECC and EC circuit 114. The ECC and EC circuit 114 performs processing so as to add an error correction code (Step S2d). The data to which the error correction code is added is stored in the RAM 113. The CPU 111 transmits memory addresses for storing these data to the RAM 213 of the operation device 2 in accordance with a memory capacity which is required to store these data (Step S2e).

When the CPU 211 receives the memory addresses, the CPU 211 replies the ID code (01) as the recognizing signal (Step S2f). The CPU 211 waits for the data to be subsequently transmitted. When the CPU 111 receives the replied recognizing signal, the CPU 111 transmits the data to which the error correction code is added (Step S2g).

The CPU 211 transmits the received data to the ECC and EC circuit 214. The ECC and EC circuit 214 performs processing of the error correction (Step S2h). In a case where an error is generated in the error correction processing (that is, error correction cannot be performed), an error is transmitted (Step S2i). The CPU 111 again transmits the data to which the error correction code is added (Step S2f). In a non-error condition (i.e., in a case where error correction is possible), the recognizing signal of data receipt is replied to (Step S2j).

The CPU 211 refers to the reference information in order to convert the received data to a corresponding control code or the like; thereby, controlling the operation of the processing section 218 (Step S2k). A condition of the operation of the processing section 218 is detected by the sensor section 222. The detected sensor data are transmitted to the display section 219b of the front panel 219 through the I/F 220; and the detected operating condition is displayed on the display section 219b of the front panel 219. Moreover, the sensor data are transmitted to the CPU 211. The code of the sensor or the like is added to the sensor data. The sensor data are transmitted to the ECC and EC circuit 214. After the error correction code has been added to the sensor data by the ECC and EC circuit 214, the sensor data are transmitted to the concentrated controller 1 through the I/F 217 (Step S21).

Meanwhile, when the CPU 111 first receives the replied recognizing signal, the operation control condition of the processing section 218 is displayed on the monitor 122. Furthermore, when the sensor data are received, processing of error correction is performed by the ECC and EC circuit 114 (Step S2m). In a case where an error is generated in the error correction processing, the error is transmitted (Step S2n). The CPU 211 again transmits the sensor data to which the error correction code is added (Step S21). In a non-error condition (i.e., in a case where error correction is possible), the CPU 111 replies with the recognizing signal (Step S2o).

Furthermore, in a case where additional different controls or the like are performed with respect to the processing section 218, corresponding operation is performed from the keyboard 118 or the like in order to transmit a corresponding command and corresponding data to the operation device 2.

Meanwhile, in order to stop the operation of the processing section 218 of the operation device 2, operation to stop the operation is performed in order to transmit a stop command (Step S2p).

The CPU 211 replies with the recognizing signal of the stop command (Step S2q). When the CPU 111 receives the reply, the CPU 111 requests judgement as to whether or not operating control with respect to the operation device 2 has ended (Step S2r). In a case where the end is selected with respect to this judgement, the program proceeds to the next release processing step as in Step S3. In a case where the end is not selected, the program is again returned to Step S2a.

Figure 9:
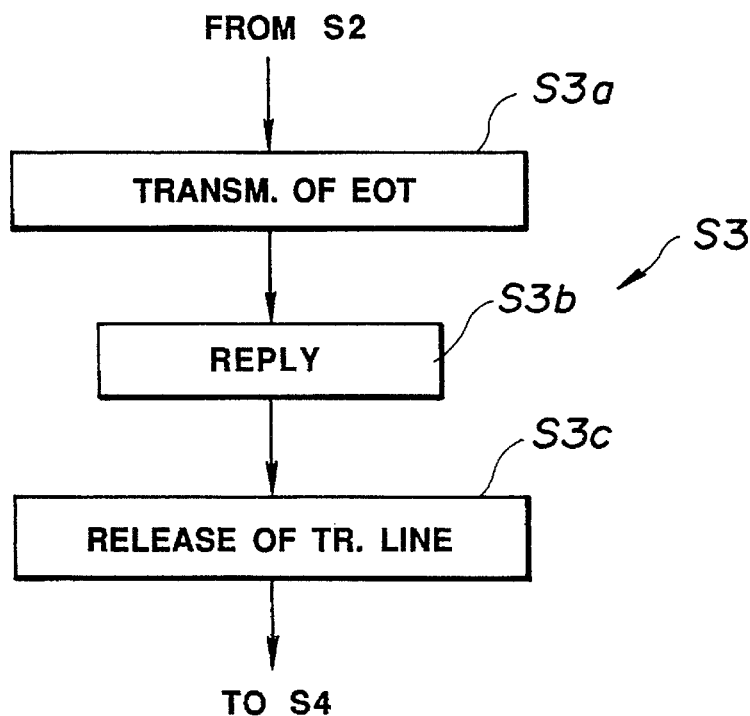

FIG. 9 shows contents of the release processing.

When the operator performs operation to select the end, the CPU 111 transmits the command of the transmitting end to the operation device 2 (Step S3a). When the CPU 111 receives the command of transmission end, the CPU 211 replies with the recognizing signal (Step S3b) in order to release the transmission line. Similar to the other operation devices i, the CPU 211 is brought to a condition of waiting for one's own ID code being transmitted.

Meanwhile, when the CPU 111 receives the recognizing signal, the CPU 111 recognizes that connection with respect to the operation device 2 is released so as to release the transmission line.

Subsequently, judgement as to whether or not FIG. 6 ends is asked (Step S4). That is, judgment as to whether or not operation of the other operation devices i is controlled is asked. In a case where such end is not selected, but operation of the other operation devices i is controlled, the program is returned to Step S1. By an operation similar to the operation control of the operation device 2, subsequent control operation of the other operation devices i is made possible. Meanwhile, in a case where the end is selected, the operation of concentrated control then terminates.

Figure 10:
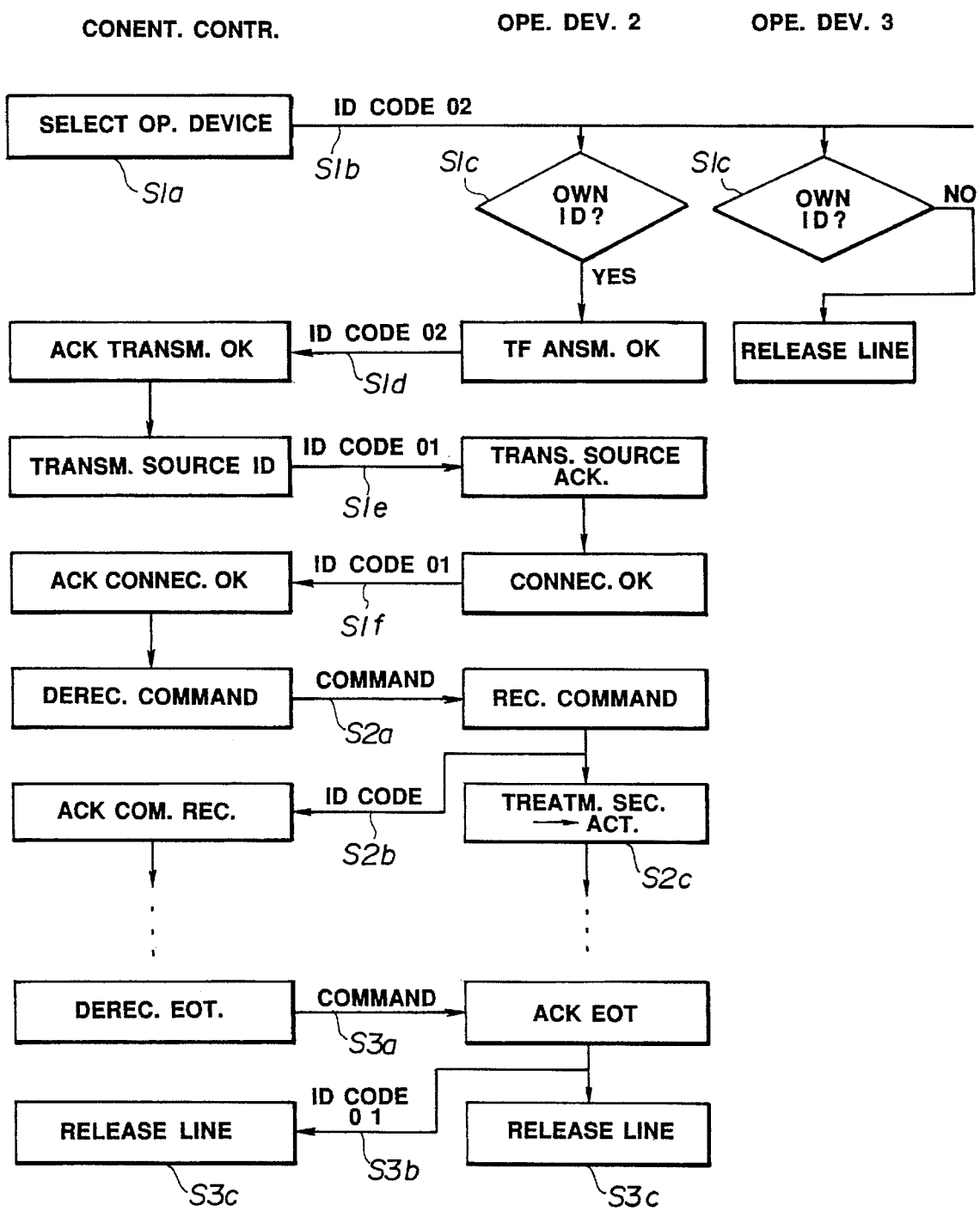

FIG. 10 shows schematics of the processing contents on the side of the concentrated controller 1 and the operation devices (2, 3) which correspond to FIGS. 7 to 9.

According to the present embodiment, an operating section of the concentrated controller 1 is operated whereby it is possible to control operation of the desired operation device j at a single location, and to also subsequently control operation of the other operation devices.

Accordingly, since operation of the plurality of operation devices can be controlled without moving such devices to another location, it is possible to quickly control operation of the operation devices without requiring any additional time to move such devices. Moreover it is possible to operate the operation devices by a single operator.

Furthermore, operation can be performed even if not within a large operating room (i.e., without the essential space required to operate various kinds of manually operated devices as in the prior art example, or the space for moving the various operation devices, or the like). Further, it is also possible to arrange the operating section of the concentrated controller 1 to a location near the doctor. Thus, it is possible to reliably prevent a hearing error or the like of the doctor's instructions from occurring. Moreover, the concentrated controller 1 and the various operation devices are connected to each other by the three (3) lines including the GND line in the first embodiment, whereby signal transmission in both the directions due to the handshake is possible so that laying of the cable is made easy.

Furthermore, since the ID codes are individually allocated to the concentrated controller 1 and the various operation devices 2–N, it is possible to prevent erroneous connection of the devices by the ID codes or erroneous operation upon control from occurring.

Figure 11:
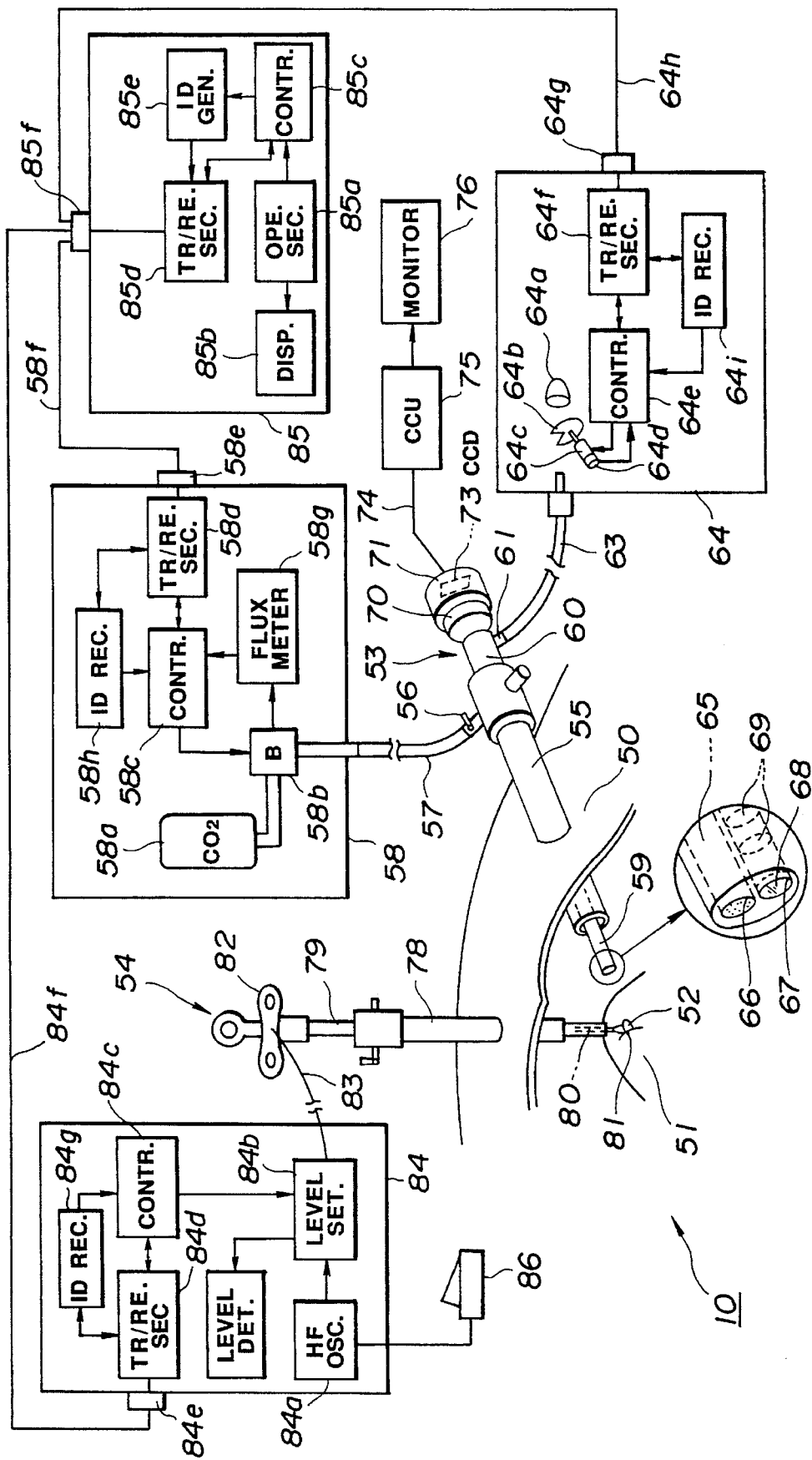

FIG. 11 shows an example of a specific system 10 to which the first embodiment of the invention is applied, and shows an aspect in which operation is performed for cutting off a polyp 52 formed on internal organs 51 within, for example, the abdomen 50 by a high-frequency electrocautery 54 under observation of a hard endoscope 53.

The abdomen 50 is formed therein with a bore by a trocar (not shown), and a sheath 55 into which the hard endoscope 653 is inserted. The sheath 55 has a proximal end thereof. One end of a tube 57 is connected to a clasp at the proximal end of the sheath 55 which is provided with a cock 56. The other end of the tube 57 is connected to a peritoneal device 58 which performs peritonealizing.

The hard endoscope 53 has a hard inserting section 59 which is inserted into the sheath 55. A light guide cable 63 in which a bundle of light guide fibers is incorporated has one end thereof which is connected to a light guide clasp 61 which is provided in a projection on a grip section 60 on a side of a proximal end of the inserting section 59. A connector at the other end of the light guide cable 63 is connected to a light source unit 64.

Illuminating light of the light source unit 64 is transmitted by the light guide cable 63, and is supplied to a light guide 65 within the hard endoscope 53. The illuminating light transmitted by the light guide 65 is forwardly extended from an outgoing end face which is mounted on an illuminating window 66 at a forward end of the inserting section 59.

A subject illuminated focuses into an image on a focal surface by an objective lens 68 which is mounted on an observing window 67 adjacent to the illuminating window 66. The image is transmitted toward an ocular section 70 which is provided on a proximal end of the grip section 60 by a relay optical system 69. It is possible to observe, in an enlarged view, the image through an ocular which is mounted on the ocular window in the ocular section 70.

In FIG. 11, a TV camera 71 is mounted on the ocular section 70, and the image is focused on a CCD 73 by lenses of the TV camera 71. An image pick-up signal photoelectrically transferred by the CCD 73 is inputted to a CCU (or a video processor) 75 which performs signal processing, through a cable 74, and is converted to a standard image signal. The image signal is inputted to a monitor 76 in order to display a subject image.

Further, a sheath 78, into which a high frequency electrocautery 54 is inserted, is inserted into a bore which is provided through another part of the abdomen 50. The high frequency electrocautery 54 has an electrode 80 which is inserted into an insulating guide tube 79. The electrode 80 has a forward end thereof which is connected to a looped excision 81. A proximal end of the electrode 80 is connected to a high frequency electric source 84 which outputs a high frequency drive signal through a cable 83 connected to a connector that is provided on a slider 82 forming an operating section at the proximal end of the guide tube 79.

An operator performs an operation by forwardly and rearwardly sliding the slider 82 of the operating section, whereby the operator can project the excision 81 at the formed end from the guide tube 79, and is evacuated (accommodated) into the guide tube 79.

The high frequency power source 84 is connected to a foot switch 86. The operator depresses the foot switch 85 to thereby turn on a switch. Thus, the high frequency power source 84 can set the foot switch 86 to a condition for outputting the drive signal.

The high frequency power source 84 is provided therein with a level setting section 84b which variably sets a power level of the drive signal from a high frequency oscillator 84a. The level setting section 84b can variably set the power level through a control section 84c. The control section 84c is connected to a communication port 84e through a transmitting and receiving section 84d. The communication port 84e is connected to a communication port 85f of a concentrated controller 85 through a cable 84f.

Moreover, the high frequency power source 84 has an ID recognizing section 84g therein for storing an ID code of the device, and for judging whether or not an ID code transmitted from the concentrated controller 85 is in agreement with one's own code.

The concentrated controller 85 comprises an operating section 85a for performing concentrated operation; a display section 85b for displaying operational contents of the operating section 85a; a control section 85c for converting the operational contents to operational information (such as, a command or the like) corresponding to the operational contents of the operating section 85a; a transmitting and receiving section 85d in which function of transmission and receipt is controlled by the control section 85c; and an ID generating section 85e for generating an ID code of a device to be controlled. The transmitting and receiving section 85d is connected to the communication port 85f.

The operator operates the operating section 85a of the concentrated controller 85 in accordance with an indication or instructions from the operator so that the operator can variably and remotely set the power level of the drive signal to an instructed value.

Further, the peritoneal device 58 has a gas bomb 58a of, for example, $CO_2$ as a peritonealizing gas supply source. Gas in the gas bomb 58a is connected to the tube 57 through a valve 58b which is capable of adjusting flow rate of the gas.

The valve 58b can control the operating and closing, an amount of opening or the like by a control section 58c. The control section 58c is connecting to a communication port 58c. The control section 58c is connected to a communication port 58e through a transmitting/receiving section 58d. The communication port 58e is connected to the communication port 85f of the concentrated controller 85 through a cable 58f.

Further, a flux meter 58g for measuring flow rate is provided in the vicinity of the valve 58b. A detected flow rate value is outputted to the control section 58c.

Moreover, the peritoneal device 58 has an ID recognizing section 58h therein which stores therein ID codes of the devices and which judges whether or not an ID code transmitted from the concentrated controller 85 is in agreement with one's own ID code.

In accordance with the operator's instructions, the operator operates the operating section 85a of the concentrated controller 85 so as to be capable of opening and closing the valve 58b, and capable of variably and remotely setting flow rate speed, a flow rate value or the like in a case where the valve 58b is opened for instructed values.

Furthermore, the light source unit 64 has a stop or iris 64b for variably setting an amount of illuminating light supplied to an end face of the light guide cable 63 from a lamp 64a. The stop 64b is rotated by a motor 64c so that the amount of illuminating light is variably set in accordance with a rotated angle. An encoder 64d is mounted on the motor 64c so as to detect the amount of rotation of the motor 64c or a rotational angle of the stop 64b; thereby, outputting the detected amount of rotation of the motor 64c or the detected amount of rotational angle of the stop 64b to a control section 64e.

The control section 64e is capable of controlling rotation of the motor 64c. The control section 64e is connected to a communication port 64g through a transmitting/receiving section 64f. The communication port 64g is connected to the communication port 85f of the concentrated controller 85 through a cable 64h. Further, the light source unit 64 has an ID recognizing section 64i therein for storing the ID codes of the devices and for judging whether or not the ID code transmitted from the concentrated controller 85 is in agreement with one's own ID code.

The control section 64e refers to the detected output of the encoder 64d in a case where a value of the amount of illuminating light is instructed to control the amount of rotation of the motor 64c. Moreover, in a case where a command which instructs an increase in the amount of illuminating light is received, the motor 64c is rotated little by little toward a side where the amount of illuminating light increases.

The operator operates the operating section 85a of the concentrated controller 85 in accordance with the instructions from the operator so as to be capable of variably controlling the value of the rotational angle of the stop 64b, and capable of variable and remotely setting the value of the rotational angle of the stop 64b to the instructed value of the amount of illuminating light or the like.

According to the system 10, as illustrated in FIG. 11, the operator operates the operating section 85a of the concentrated controller 85 in accordance with the instructions from the operator so as to be: (1) capable of setting the gas to a value suitable for observation or excision, within the abdomen 50 by a first peritoneal function due to the peritoneal device 58 at, for example, a single location without movement; (2) capable of next setting the amount of illuminating light due to the light source unit 64 to a value suitable for observation; and (3) capable of next setting the power level of the high frequency power source 84 to a value suitable for excision.

A modification of the first embodiment will next be described. In the first embodiment, in a case where information is transmitted from the side of transmission to the side of reception, the side of reception returns the acknowledgement signal in which the information is received to the transmission side.

Figure 12:
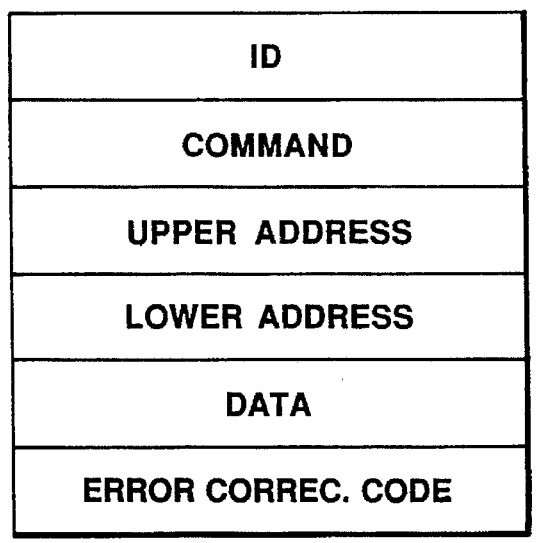

In order to further realize a fast response, the information may be sent as a command packet as shown in, for example, FIG. 12 in order to operate an optional operation device i from the concentrated controller 1. In FIG. 12, the ID code, the command, the addresses, the data and the error detection correcting code are transmitted as a single command packet.

In this case, the operating unit i operated by the ID code is specified; instruments of the processing section i01 are turned ON by a subsequent command; and the area storing the data for controlling the operational contents of the instruments turned ON by subsequent address high order and address low order is secured; and subsequently, the data are transmitted. The data may include data contents for operating by a first command under a certain condition and for a certain period of time, and data contents for subsequently stopping the first command, and may further include data contents for operating the other instruments which form the processing section i01.

Moreover, the error detection correcting code is added, and data are sent such that the command or the like is detected without error. As shown in FIG. 12, the error detection correcting code may be transmitted in the order of an ID code, a command, . . . , or may be transmitted as a packet in which the error detection correcting code exits in combination.

It is judged whether or not the packet is in agreement with the transmitted ID code on the side of the operating unit i. The operating unit having the agreed ID code performs operation corresponding to the command or the like subsequent to the ID code.

According to the modification, the information is transmitted as a packet whereby it is made possible to control more fine operational contents by the transmission of the information of a single packet, and it is also made possible to perform a plurality of operational contents. Thus, the response speed can be improved more than in the first embodiment.

Figure 13:
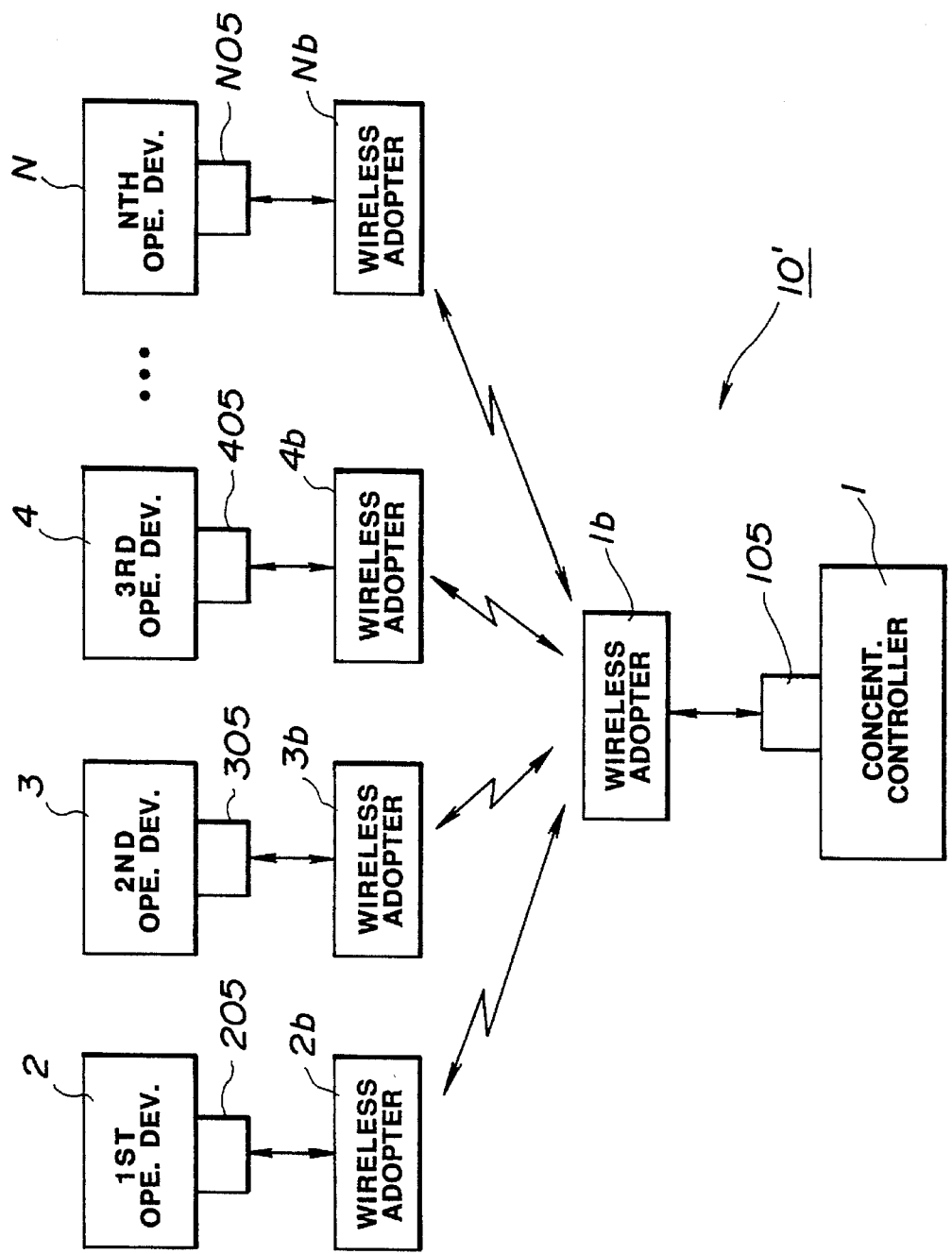
FIGS. 13 and 14 relate to a second embodiment of the invention, FIG. 13 being a block diagram showing a conceptional arrangement of an operation-device control system according to the second embodiment.

FIG. 13 is a schematic view of an operation-device control system 10' according to a second embodiment of the invention.

In the present embodiment, in order to transmit a signal, a wire (such as, a cable or the like) that is a signal transmitting means is not used, but wireless adapters 1b~Nb for transmitting a wave, an infrared ray or the like are connected to a communication port 105 of a concentrated controller 1 and communication ports of various respective operating units 2~N, and communication and control similar to those of the first embodiment are performed in a wireless manner, i.e., having no connecting lines between the wireless adapters 1b~Nb and the concentrated controller 1.

Figure 14:
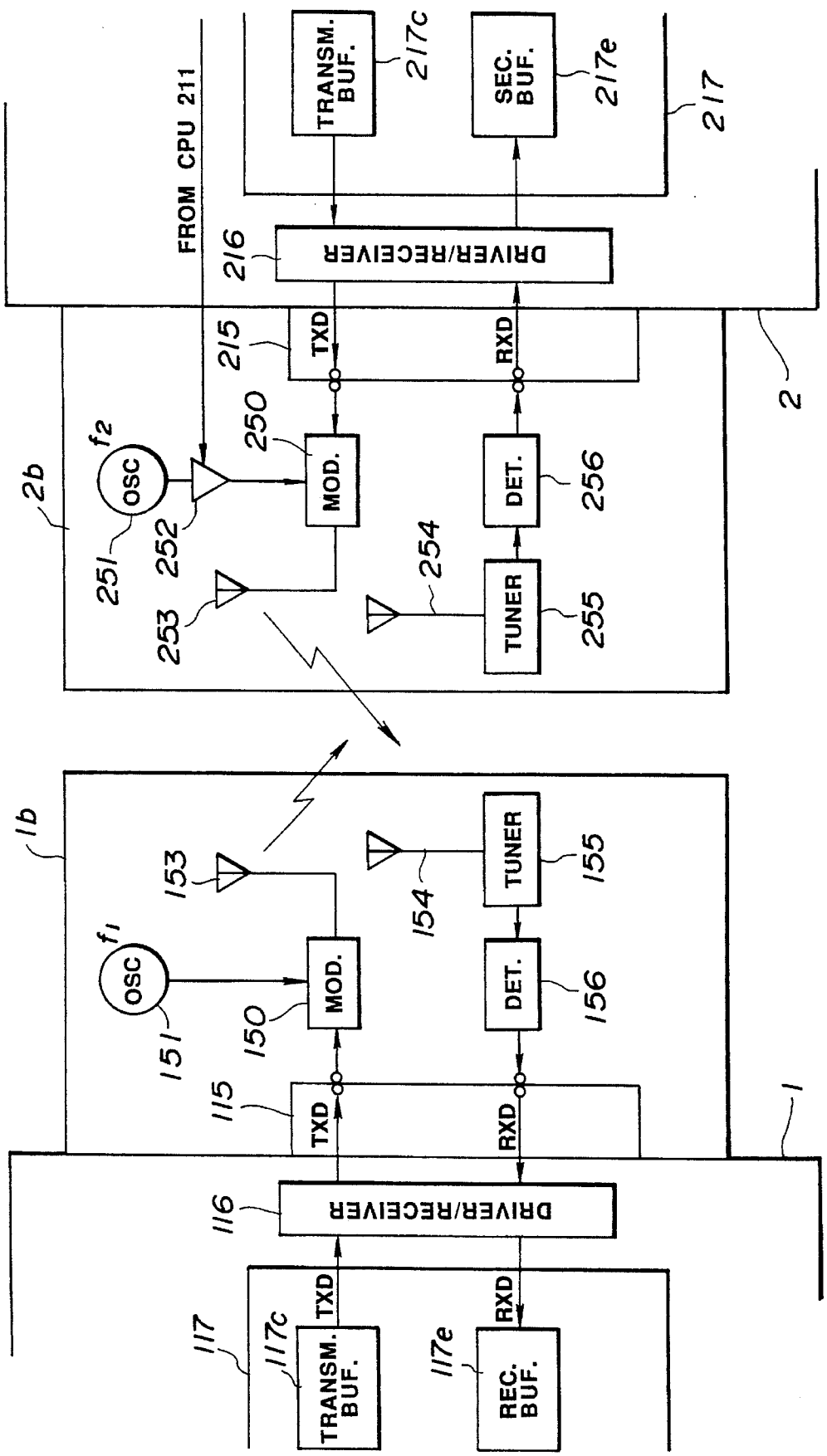

FIG. 14 shows an example of the wireless adapters 1b and 2b.

The wireless adaptor 1b is connected to the connector 115 as illustrated in FIG. 3. A transmitting terminal TXD is inputted to a modulator 150 (a terminal to be modulated thereof). An output from the modulator 150 is AM-modulated by an output from an oscillator 151 having a frequency of f1, and is transmitted from an antenna 153 as a wave.

The wave transmitted from the antenna 153 is received by an antenna 254 of the wireless adaptor 2b; and is inputted to a wave detector 256 through a tuner 255 having a resonance characteristic which is resonated with the wave having a frequency of f1. A signal detected by the wave detector 256 is stored in a receiver buffer 217e from a receiving terminal RXD of a connector 215 through a driver/receiver 216.

A signal passing through the driver/receiver 216 and transmitted from a transmitting terminal TXD of the connector 215 is inputted to a modulator 250 (a terminal to be modulated thereof). The signal is AM-modulated by an output from an oscillator 251 with a frequency of f2, through a 3-state buffer 252, and is transmitted from the antenna 253 as the wave. The 3-state buffer 252 is normally set under a high impedance condition by a CPU 211 as in the buffer 216a in FIG. 4, and is maintained under a condition in which the wave cannot be emitted toward the concentrated controller 1. In a case where the operation device 2 is selected from the side of the concentrated controller 1, the 3-state buffer 252 is set to "activate" so as to be capable of transmitting the wave.

The wave transmitted from the antenna 253 is received by an antenna 154 of the wireless adaptor 1b; and is inputted to a wave detector 156 through a tuner 155 of the resonance characteristic which is resonated with the wave with a frequency of f2. The signal detected by the wave detector 156 is stored in a receiver buffer 117e from a receiving terminal RXD of the connector 115 through a driver/receiver 116.

The other wireless adapters 3b~Nb are the same in arrangement as the wireless adaptor 2b.

According to the present embodiment, the operation devices 2~N are connected to the concentrated controller 1 through the signal transmitting means 2a~Na in the first embodiment with the wiring being complicated, depending upon the manner in which the operation devices 2~N are arranged in the connecting and operating chamber. In a case of the second embodiment, however, since the wave is used in place of the cable serving as the signal transmitting means, it is possible to further improve environment and safety within the operating chamber.

As a result, the operation devices 2~N do not require interconnection thereof within the operating chamber or connection to the concentrated controller 1, and can operate with mere communication and gang control; and concentrated control at a remote location are performed. Since there are no control lines (such as, the unnecessary cables or the like) and the data communication line, an attempt can be mad to further improve environment within the operating chamber and to improve safety. It is thus possible to simply systematize the operation devices.

In FIG. 14, the device for performing transmission and receiving by the wave is shown as the wireless adapters 1b~Nb. However, a device for performing transmission and receiving by light (such as, the infrared ray or the like) may be used.

The operation devices 2~N are remotely controlled in a concentrated manner by the concentrated controller 1. The operator who receives instructions from the operator who is in a clean range or area operates the concentrated controller 1 in accordance with the instructions from the operator to alter or change a mode of the operation device 2, for example, or to switch an output level of the operation device 3, while recognizing a condition of the operation device 4. Alternatively, the concentrated controller 1 which receives the condition data of the operation device 5 automatically or manually transmits instructions to the other operation devices (such as, the operation devices 2, 3 or the like), at real time, which must switch the interlocking condition on the basis of the data.

Since the ID numbers are individually allocated to the concentrated controller 1 and the operation devices 2~N, it is possible to prevent erroneous connection of the system or erroneous operation upon the control with the use of the ID numbers.

In this manner, since the operation devices 2~N are controlled in a concentrated manner by the concentrated controller 1 with respect to a conventional arrangement in which the operation devices 2~N are independently or individually controlled, the operator can remotely change or alter the operations of the operation devices 2~N in a concentrated manner and by a single person. Accordingly, operations in this invention are considerably improved. That is, not only is the burden of the operator reduced, but also the operating chamber is relatively widened. Thus, the operating environment becomes further improved.

In connection with the above, it has been described in the aforesaid embodiments that the peculiar ID codes are respectively applied to the operation devices 2~N. However, a common code may be applied to a plurality of operation devices in addition to the peculiar ID codes.

With the latter arrangement, operation of the plurality of operation device can be set to a condition such that operation of the plurality of operation devices can be simultaneously controlled by transmission of the common code.

Moreover, in a case where the ID code is transmitted to the operation device in which access is made from the concentrated controller, ID cords must not be in perfect agreement with the ID cords of the operation devices. For example, in a case where the ID codes are transmitted, the ID codes may be transmitted with error correction code applied thereto. Alternatively, the ID codes of the operation devices may be transmitted by modulated codes or the like which convert the ID codes of the operation devices by a constant or predetermined conversion rule or regulations.

Furthermore, the aforementioned embodiments have been described such that the concentrated controller has a single common communication port. However, the arrangement may be such that a plurality of communication ports are provided, and the concentrated controller is connected to the plurality of operation devices through the plurality of operation devices through the plurality of communication ports. By doing so, it is possible to simply and simultaneously set the plurality of operation devices under an operative condition so as to simultaneously control operating functions which are different from each other.

In connection with the above, the present invention includes structural arrangements having the above-described various embodiments, partially or in combination.

While the invention has been particularly shown and described in reference to preferred embodiments thereof, it will be understood by those skilled in the art that changes in form and details may be made therein without departing from the spirit and scope of the invention

What is claimed is:

1. A medical operation control system, comprising:

a first operation means having a first communication port for performing bidirectional communication, a first ID recognizing means for recognizing whether agreement is made with a first ID information, a first treatment section means for performing treatment operation, and a first control section means for controlling operation of said first treatment section in accordance with recognition results due to said first ID recognizing section means, with respect to information which is received through said first communication port;

a second operation means having a second communication port capable of performing bidirectional communication, a second ID recognizing section means for recognizing whether agreement is made with second ID information, a second treatment section means for performing treatment operation, and a second control section means for controlling operation of said second treatment section means in accordance with recognition results due to said second ID recognizing section means, with respect to information which is received through said second communication port; and a concentrated control means for: (a) controlling operation of said first and second treatment section means, (b) performing bidirectional communication with said first and second communication ports, and (c) transmitting ID information corresponding to said first and second ID information, wherein said concentrated control means further stores reference information for interpreting said ID information and operational information for controlling operations of said first and second treatment section means.

2. An operation control system according to claim 1, including a third operation means which is different from said first operation means and said second operation means.

3. An operation control system according to claim 1, wherein said communication port is connected to said first communication port and said second communication port through a signal transmission cable.

4. An operation control system according to claim 1, wherein said communication port which is connected to said first communication port and said second communication port is a common communication port.

5. An operation control system according to claim 1, wherein said first communication port and said second communication port have respective signal transmitting terminals thereof which are connected to a signal receiving terminal of said communication port, and wherein said first communication port and said second communication port have respective signal receiving terminals thereof which are connected to a signal transmitting terminal of said communication port.

6. An operation control system according to claim 1, wherein said communication port is connected to said first communication port and said second communication port by three lines including a GND line.

7. An operation control system according to claim 1, wherein said first and second control section means performs bidirectional communication between said first and second communication ports and said communication port in a case of such recognition result that said ID information transmitted from said transmitting means by said first and second ID recognizing section means is in agreement with said first and second ID information.

8. An operation control system according to claim 1, wherein said first and second control section means stops communication function such that at least said first and second communication ports of said first and second communication ports and said communication ports are located on a transmitting side, in a case of recognition result such that, by said first and second ID recognizing section means, said ID information transmitted from said transmitting means is not in agreement with said first and second ID information.

9. An operation control system according to claim 1, wherein said first and second control section means set respective transmitting terminals in said first and second communication ports to high impedance, in a case of recognition result that said ID information transmitted from said transmitting means is not in agreement with said first and second ID information.

10. An operation control system according to claim 1, wherein said concentrated control means error-correction-code applying means for applying an error correcting code to transmitted information.

11. An operation control system according to claim 1, wherein said first and second operation means have error-correction-code applying means for applying an error correcting code to transmitted information.

12. An operation control system according to claim 1, wherein said concentrated control means has error correcting means for performing error correction of received information.

13. An operation control system according to claim 1, wherein said first and second operation means have error correcting means for performing error correction of received information.

14. An operation control system according to claim 1, wherein, in a case where said first and second operation means receive information transmitted from said concentrated control means, said first and second operation means reply information of receipt recognition to said concentrated control means.

15. An operation control system according to claim 1, wherein, in a case where said concentrated control means receives information transmitted from said first and second operation means, said concentrated control means replies information of receipt recognition to said first and second operation means.

16. An operation control system according to claim 1, wherein a connection of said communication port to said first communication port and a connection of said communication port to said second communication port are wireless.

17. An operation control system according to claim 1, wherein said communication port is connected to said first communication port and said second communication port by wire.

18. An operation control system according to claim 1, wherein said communication port, said first communication port and said second communication port have wireless transmitting and receiving means for performing transmission and for receiving.

19. An operation control system according to claim 1, wherein said communication port, said first communication port and said second communication port have respective signal transmitting ports of an RS-232C standard.

20. An operation control system according to claim 1, wherein said first operating section means and said second operating section means have respective operation treatment functions different from each other.

21. An operation control system according to claim 1, wherein one of said first and second operation means is a peritoneal device which supplies gas to thereby be peritonealized.

22. An operation control system according to claim 1, wherein one of said first operation means and said second operation means is a high-frequency electrocautery which performs excision by application of a high-frequency drive signal.

23. An operation control system according to claim 1, wherein one of said first operation means and said second operation means is an endoscope apparatus for use in observation.

24. A medical operation control system, comprising:
a plurality of operation devices each having a communication port capable of performing bidirectional communication, an ID recognizing section for recognizing whether agreement is made to an ID information, a treatment section for performing operation treatments different from each other, and a control section for controlling operation of said treatment section in accordance with recognizing results due to said ID recognizing section, with respect to information received through said communication port; and
a concentrated control means for: (a) controlling operation of an optional treatment section in said plurality of operation devices, (b) performing bidirectional communication with said communication port, and (c) transmitting operating information corresponding to said ID information, wherein said concentrated control means further stores reference information for interpreting said ID information and operational information for controlling said optional treatment section in said plurality of operation devices.

* * * * *

UNITED STATES PATENT AND TRADEMARK OFFICE
CERTIFICATE OF CORRECTION

PATENT NO.:   5,609,560
DATED     :   March 11, 1997
INVENTOR(S):  ICHIKAWA, et al.

It is certified that error appears in the above-identified patent and that said Letters Patent is hereby corrected as shown below:

On the Title Page item [73], the Assignee's city is incorrectly misspelled. Please correct "TOKOYO" to be spelled -- TOKYO --.

Signed and Sealed this

Eighth Day of July, 1997

Attest:

BRUCE LEHMAN

*Attesting Officer*        *Commissioner of Patents and Trademarks*